US009277497B2

(12) United States Patent
Ansari et al.

(10) Patent No.: US 9,277,497 B2
(45) Date of Patent: Mar. 1, 2016

(54) CELL SIZE OPTIMIZATION FOR ENERGY SAVINGS IN CELLULAR NETWORKS WITH HYBRID ENERGY SUPPLIES

(71) Applicant: New Jersey Institute of Technology, Newark, NJ (US)

(72) Inventors: Nirwan Ansari, Montville, NJ (US); Tao Han, North Arlington, NJ (US)

(73) Assignee: NEW JERSEY INSTITUTE OF TECHNOLOGY, Newark, NJ (US)

( * ) Notice: Subject to any disclaimer, the term of this patent is extended or adjusted under 35 U.S.C. 154(b) by 311 days.

(21) Appl. No.: 13/881,147

(22) PCT Filed: Oct. 26, 2012

(86) PCT No.: PCT/US2012/062135
§ 371 (c)(1),
(2) Date: Apr. 23, 2013

(87) PCT Pub. No.: WO2014/065818
PCT Pub. Date: May 1, 2014

(65) Prior Publication Data
US 2014/0119254 A1     May 1, 2014

(51) Int. Cl.
*H04L 12/50*     (2006.01)
*H04W 52/02*     (2009.01)

(52) U.S. Cl.
CPC ...... *H04W 52/0206* (2013.01); *H04W 52/0203* (2013.01); *Y02B 60/50* (2013.01)

(58) Field of Classification Search
CPC .................................................... H04W 52/02
USPC .......................................................... 370/311
See application file for complete search history.

(56) References Cited

U.S. PATENT DOCUMENTS

| 6,006,096 | A | 12/1999 | Trompower |
| 2005/0176419 | A1 | 8/2005 | Triolo et al. |
| 2010/0056184 | A1* | 3/2010 | Vakil et al. ................ 455/456.5 |
| 2012/0028630 | A1 | 2/2012 | Yamamoto et al. |
| 2012/0231806 | A1 | 9/2012 | Maric et al. |
| 2012/0244869 | A1 | 9/2012 | Song et al. |
| 2012/0252521 | A1* | 10/2012 | Nagaraja et al. ............. 455/522 |
| 2013/0013234 | A1* | 1/2013 | Ahmed et al. .................. 702/62 |
| 2013/0031244 | A1* | 1/2013 | Zhang et al. .................. 709/224 |

OTHER PUBLICATIONS

International Search Report and Written Opinion filed on Oct. 26, 2012, mailed Mar. 1, 2013.

(Continued)

*Primary Examiner* — Shripal Khajuria
(74) *Attorney, Agent, or Firm* — Turk IP Law, LLC

(57) ABSTRACT

Technologies are generally described for reducing the from-power-grid energy consumption of a wireless network such as a cellular network over a period of time through cell size adaptations. According to some examples, cell sizes for the base stations may be optimized by decomposing the cell size optimization into two approaches: a multi-stage energy allocation approach and an energy consumption minimization approach. By implementing an energy allocation policy based on available energy type (e.g., from-power-grid or renewable) and an approximation technique for the energy consumption minimization, cell size optimization for each base station may be achieved resulting in network-wide enhancement of renewable energy usage vs. from-power-grid energy usage.

42 Claims, 7 Drawing Sheets

(56) References Cited

OTHER PUBLICATIONS

Tipper et al., "Dimming Cellular Networks", Global Telecommunications Conference, Dec. 6-10, 2010.
Han, et al., Green radio: Radio Techniques to Enable Energy-Efficient Wireless Networks, Communications Magazine, IEEE, vol. 49, No. 6, pp. 46-54, Jun. 2011.
Taverner, "Community Power Using Mobile to Extend the Grid", Green Power for Mobile, Jan. 2010.
"Overview to LTE energy saving solutions to cell switch off/on", 3GPP TSG-RAN WG3#66bis, Valencia, Spain, Jan. 18-22, 2010.
Marsan et al., "Optimal energy savings in cellular access networks," in Communications Workshops, 2009. ICC Workshops 2009. IEEE International Conference on, Jun. 2009, pp. 1-5.
Zhou, et al., "Green mobile access network with dynamic base station energy saving," in Proc of ACM MobiCom, Beijing, China, Sep. 2009.
Oh et al., "Energy savings through dynamic base station switching in cellular wireless access networks," in Global Telecommunications Conference (GLOBECOM 2010), 2010 IEEE, Dec. 2010, pp. 1-5.
Bhaumik et al., "Breathe to stay cool: adjusting cell sizes to reduce energy consumption," in Proceedings of the first ACM SIGCOMM workshop on Green networking, New Delhi, India, Sep. 2010.
Etoh et al., "Energy consumption issues on mobile network systems," in Applications and the Internet, 2008. SAINT 2008. International Symposium on, Turku, Finland, Aug. 2008.
Samdanis et al., "Dynamic energy-aware network re-configuration for cellular urban infrastructures," in GLOBECOM Workshops (GC Wkshps), 2010 IEEE, Miami, FL, USA, Dec. 2010.
Ericson Inc., "Sustainable energy use in mobile communications," Aug. 2007, white Paper.
Zhou et al., "Energy source aware target cell selection and coverage optimization for power saving in cellular networks," in Proceedings of the 2010 IEEE/ACM Int'l Conference onGreen Computing and Communications & Int'l Conference on Cyber, Physical and Social Computing, Hangzhou, China, Dec. 2010.
Garey et al., "Computer and Intractability: A Guide to the Theory of NP-Completeness", New York, NY: W.H. Freeman and Company, 1979.
Lim et al., "The Effects of Cell Size on Total Power Consumption, Handover, User Density of a Base Station, and Outage Probability", The Seventh International Conference on Networking and Services, ICNS May 2011.
"Eco-sustainable Wireless Networks: Ready for Prime Time", Alcatel Lucent, pp. 2, Sep. 2009.

\* cited by examiner

CELL SIZE OPTIMIZATION FOR ENERGY SAVINGS IN CELLULAR NETWORKS WITH HYBRID ENERGY SUPPLIES

STATEMENT REGARDING FEDERALLY SPONSORED RESEARCH OR DEVELOPMENT

This invention was made with government support under grant CNS1147602 awarded by the National Science Foundation. The government has certain rights in the invention.

CROSS-REFERENCE TO RELATED APPLICATION

This Application is the U.S. National Stage filing under 35 U.S.C §371 of PCT Application No. PCT/US2012/062135 filed on Oct. 26, 2012. The PCT Application is herein incorporated by reference in its entirety.

BACKGROUND

Unless otherwise indicated herein, the materials described in this section are not prior art to the claims in this application and are not admitted to be prior art by inclusion in this section.

In wireless cellular networks, energy consumption is mainly drawn from base stations (BSs). According to the power consumption breakdown, BSs may consume more than half of the power of a cellular network. As the number of BSs increases along with expanded coverage and networks of competing service providers, reducing the power consumption of BSs may be a desirable goal for small carbon footprint cellular networks. Designing energy efficient base stations to reduce the energy consumption of cellular networks is one approach pursued by service providers.

Efforts on making cellular networks more "green" (i.e., environmentally friendly through increased use of renewable energy and reduced use of fossil-based energy) may further include designing power saving communication protocols that adjust the transmit power of the transceivers according to the traffic intensity as an approach. A further approach may include designing heterogeneous radio access networks which may utilize a diverse set of base stations to improve spectral and energy efficiency per unit area. Yet another approach may include designing off-grid BSs and communication protocols to enable utilization of renewable energy in cellular access networks. Renewable energy such as sustainable biofuels, solar, and wind energy are promising options for reducing the from-power-grid energy consumed by BSs and reducing the carbon footprint of cellular networks.

SUMMARY

The present disclosure generally describes techniques for optimizing cellular network cell sizes for overall energy savings and/or maximization of renewable energy use.

According to some examples, a method for optimizing hybrid energy use in cellular communication networks through cell size adjustment is described. An example method may include determining an energy consumption by a plurality of base stations in a cellular communication network and determining an energy allocation for each of the base stations, where the energy allocation for each of the base stations depends on energy allocations for remaining base stations. The example method may also include instructing the base stations to adjust their transmit power according to the determined energy allocation for each base station; and causing cell sizes for each of the base stations to be adjusted based on end devices in respective cells selecting to remain in their respective cell or to switch to another base station based on the adjusted transmit power of their respective base stations.

According to other examples, a controller for a cellular communication network that optimizes hybrid energy use through cell size adjustment is described. An example controller may include a communication module configured to communicate with a plurality of base stations, a power distribution module configured to receive non-renewable grid energy and provide to the plurality of base stations, and a power management module. The power management module may determine an energy consumption by a plurality of base stations and determine an energy allocation for each of the base stations, where the energy allocation for each of the base stations depends on energy allocations for remaining base stations. The power management module may also instruct the base stations to adjust their transmit power according to the determined energy allocation for each base station and cause cell sizes for each of the base stations to be adjusted based on end devices in respective cells selecting to remain in their respective cell or to switch to another base station based on the adjusted transmit power of their respective base stations.

According to further examples, a cellular-structured wireless communication network capable of optimizing hybrid energy use in through cell size adjustment is described. An example network may include a plurality of base stations serving end devices in their respective cells and a controller managing communication and power management operations of the base stations. The controller may determine an energy consumption by a plurality of base stations and determine an energy allocation for each of the base stations, where the energy allocation for each of the base stations depends on energy allocations for remaining base stations. The controller may also instruct the base stations to adjust their transmit power according to the determined energy allocation for each base station and cause cell sizes for each of the base stations to be adjusted based on the end devices in respective cells selecting to remain in their respective cell or to switch to another base station based on the adjusted transmit power of their respective base stations.

According to yet other examples, a computer-readable storage medium with instructions stored thereon for optimizing hybrid energy use in cellular communication networks through cell size adjustment is described. The instructions may cause a method to be performed when executed. The method may include determining an energy consumption by a plurality of base stations in a cellular communication network and determining an energy allocation for each of the base stations, where the energy allocation for each of the base stations depends on energy allocations for remaining base stations. The method may further include instructing the base stations to adjust their transmit power according to the determined energy allocation for each base station and causing cell sizes for each of the base stations to be adjusted based on end devices in respective cells selecting to remain in their respective cell or to switch to another base station based on the adjusted transmit power of their respective base stations.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The below described and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
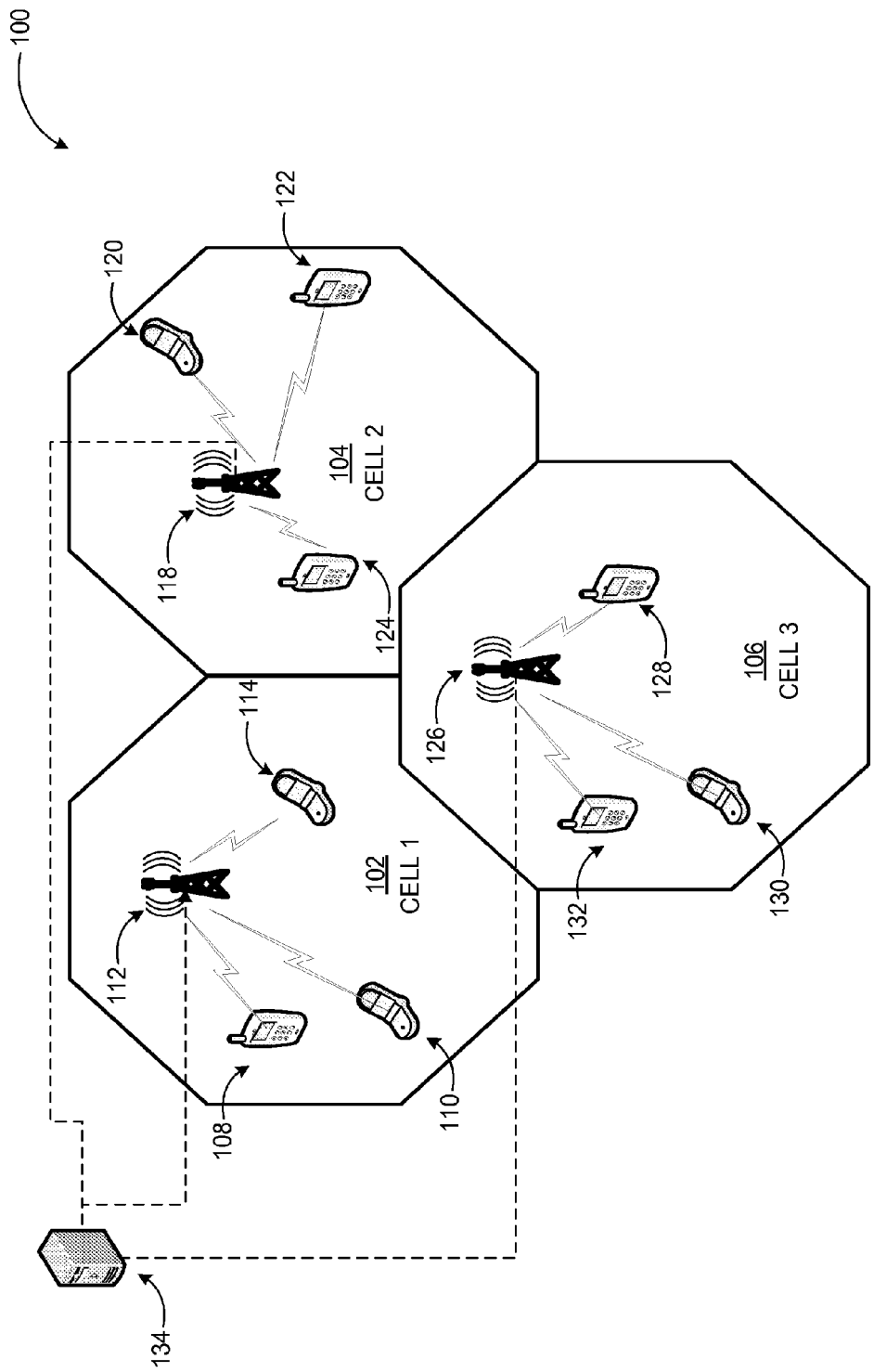
FIG. 1 is a diagram of an illustrative example cellular communication system, where cellular network cell sizes may be optimized for overall energy savings and/or maximization of renewable energy use.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to optimizing cellular network cell sizes for overall energy savings and/or maximization of renewable energy use.

Briefly stated, technologies are generally described for reducing the from-power-grid energy consumption of a wireless network such as a cellular network over a period of time through cell size adaptations. According to some examples, cell sizes for the base stations may be optimized by decomposing the cell size optimization into two approaches: a multi-stage energy allocation approach and an energy consumption minimization approach. By implementing an energy allocation policy based on available energy type (e.g., from-power-grid or renewable) and an approximation technique for the energy consumption minimization, cell size optimization for each base station may be achieved resulting in network-wide enhancement of renewable energy usage vs. from-power-grid energy usage.

FIG. 1 is a diagram of an illustrative example cellular communication system, where cellular network cell sizes may be optimized for overall energy savings and/or maximization of renewable energy use, arranged in accordance with at least some embodiments described herein.

Diagram 100 shows three example cells 102, 104, and 106, with their respective base stations 112, 118, and 126. Each bases station may communicate with a variety of user devices in their respective cells such as base station 112 communicating with smartphone 108 and cellular phones 110, 114; base station 118 communicating with smartphones 122 and 124, and cellular phone 120; and base station 126 communicating with smartphones 128 and 132, and cellular phone 130.

Network communications for control and data exchange may take place over a different communications network between the base stations and a controller such as controller 134. The base stations in a wireless (e.g., cellular) network, also referred to as "tower" are typically powered by the traditional power grid, which distributes electric power based on fossil-based or hydroelectric generation mechanisms. Increasingly, base stations may be equipped with on-location power generation systems such as solar or wind-based power generation. Furthermore, the power grids are also providing an increasing portion of their power from renewable energy sources such as solar, wind, bio-mass, etc.

As mentioned previously, in wireless cellular networks, energy consumption is mainly drawn from base stations, which may consume more than 50 percent of the power of a cellular network. Efforts on greening cellular networks may be classified into three categories.

The first category is to design power saving communication protocols that adjust the transmit power of the transceivers according to the traffic intensity. Radio access networks are generally dimensioned for peak hour traffic, and thus the utilization of the base stations may be inefficient during the off-peak hours. One approach may be to switch off the transceivers when the traffic load is below a certain threshold for a certain time period. When some base transceiver stations are switched off, radio coverage and service provisioning may be taken care of by the devices that remain active. Two user behaviors may affect traffic volumes in portions of a cellular network. The first one is the typical day-night behavior of users. The other one is mobility of users. Users tend to range over their office districts during working hours and stay home in their residential area after work. This may result in the surge of traffic in both areas at peak usage hours, but in the drop of traffic during the off-peak hours. The BS switching approach can be formulated as an optimization problem that minimizes the number of active BSs while meeting the traffic load in the access network.

The second category is to design heterogeneous radio access networks, which utilize a diverse set of base stations to improve spectral and energy efficiency per unit area. The network deployment featuring high density deployments of small, low power base stations may achieve higher network energy efficiency than the sparse deployment of few high power base stations do. Macro-Micro, Macro-Pico, Macro-Femto, Macro-Relay, and Macro-RRH (Remote Radio Head)

are some example network deployment scenarios. Heterogeneous network deployment may improve the network efficiency since it employs high density and low power base stations.

The third category is to design off-grid BSs and communication protocols to enable utilization of renewable energy in cellular access networks. Renewable energy such as sustainable biofuels, solar and wind energy are promising options to save the on-grid energy consumed by BSs and reduce the carbon footprint. Is system with a mixture of renewable energy powered and from-grid powered base stations, a hand over parameter tuning algorithm for target cell selection and a power control algorithm for coverage optimization may be employed to guide mobile users to access to the BSs with natural energy supply, thus reducing the power expense and $CO_2$ emission.

In a system according to some embodiments, hybrid energy use in cellular communication networks may be optimized through cell size adjustment. An energy consumption by multiple base stations in the cellular communication network may be determined along with an energy allocation for each of the base stations, where the energy allocation for each of the base stations depends on energy allocations for remaining base stations. The base stations may then be instructed to adjust their transmit power according to the determined energy allocation for each base station. The cell sizes for each of the base stations may be adjusted based on end devices in respective cells selecting to remain in their respective cell or to switch to another base station based on the adjusted transmit power of their respective base stations.

Figure 2:
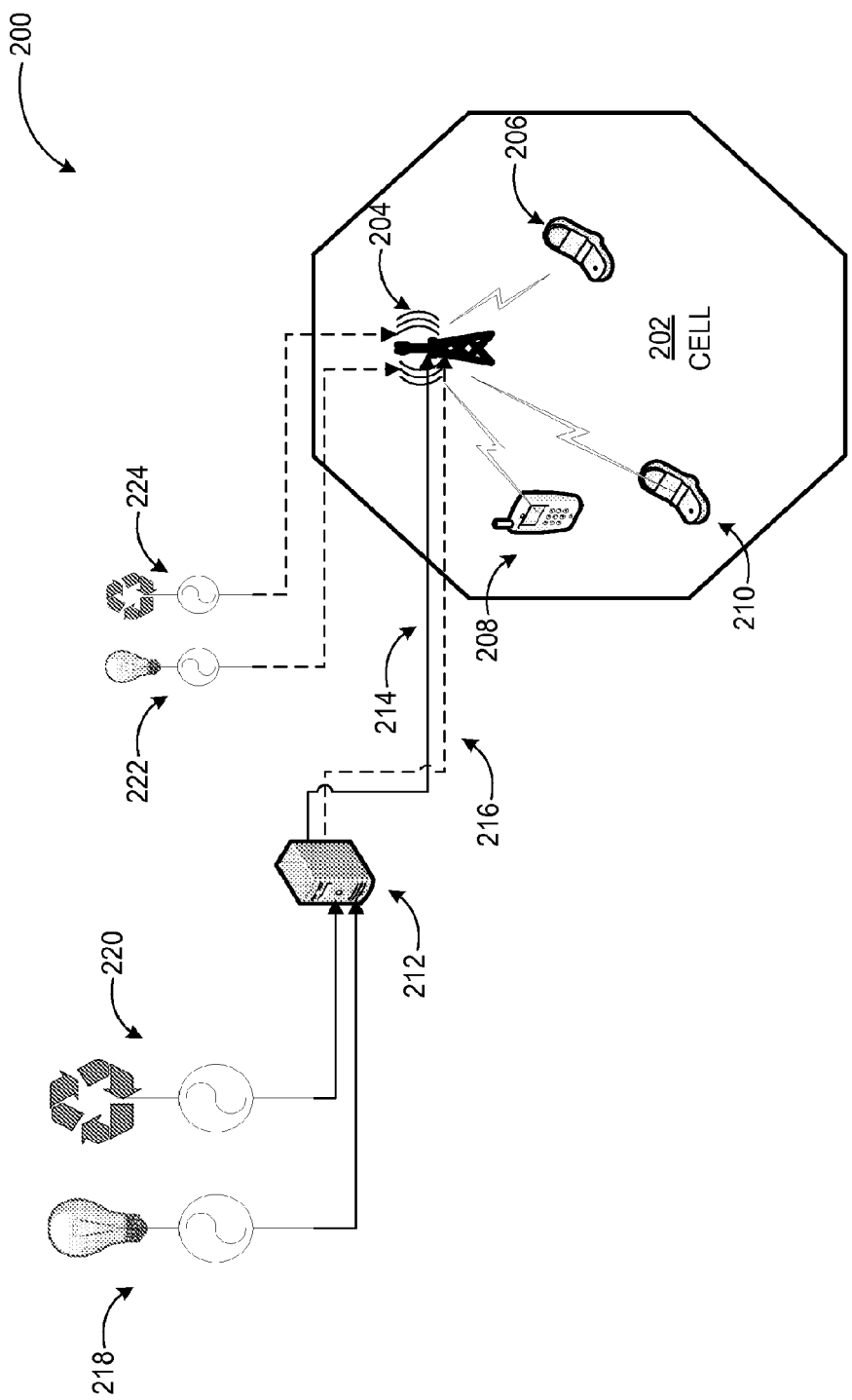
FIG. 2 illustrates an example cell of a cellular communication system, where a base station may be powered by a hybrid energy source directly or through a central management system and the energy usage may be optimized for overall savings and/or maximization of renewable energy use.

FIG. 2 illustrates an example cell of a cellular communication system, where a base station may be powered by a hybrid energy source directly or through a central management system and the energy usage may be optimized for overall savings and/or maximization of renewable energy use, arranged in accordance with at least some embodiments described herein.

Considering a cellular network 202 with N BSs and M mobile users 206, 208, 210. The BSs may update their cell sizes every T seconds by changing the power of their pilot signals. The mobile users 206, 208, 210 may select BSs based on the strength of pilot signals from BSs. For a duration of time including L cell size updates, and denoting $\vec{P}_i^0 = (p_{i,1}^0, p_{i,2}^0, \ldots, p_{i,n}^0)$ as the pilot signal power of BSs at the ith cell size update. Then, the user-BS association matrix at the ith cell size update, $X_i$, may be determined by $\vec{P}_i^0$. Let $X_i(k,j)=1$ when user k is associated with BS j; otherwise, $X_i(k,j)=0$. Assuming BSs have data transmission to the mobile users 206, 208, 210 during the {fourth root} seconds, the energy consumption of BS j during the ith interval may be expressed as:

$$C_{i,j} = \sum_{k=1}^{M} X_i(k,j) P_{k,j} \tau + P_{i,j}^{fix} \mu_{i,j} \tau. \quad [1]$$

Here, $P_{k,j}$ is the dynamic power consumption of BS j for serving user k, $P_{i,j}^{fix}$ is the static power consumption when the BS is in the active status, and $\mu_{i,j}$ is an indication function which equals 1 when BS j is active at the ith duration; otherwise, $\mu_{i,j}$ equals 0. The BS may be active when there is at least one user associated with it. Therefore, $\mu_{i,j}$ can be expressed as:

$$\mu_{i,j} = \begin{cases} 1, & \sum_{k=1}^{M} X_i(k,j) > 0; \\ 0, & \text{otherwise.} \end{cases} \quad [2]$$

At the ith cell size update, the energy storage from a renewable source at BS j is $E_{i,j}$. The amount of energy storage may depend on the energy consumption and generation of the previous interval. Therefore, $E_{i,j}$ may be expressed as:

$$E_{i,j} = \begin{cases} E_{i-1,j} - C_{i-1,j} + \alpha\tau, & E_{i-1,j} > C_{i-1,j}; \\ E_{i-1,j} + \alpha\tau, & \text{otherwise.} \end{cases} \quad [3]$$

Here, $\alpha$ is the energy generation rate which indicates the amount of energy generated from the renewable source per second. Denoting $E_{0,j}$ as the initial renewable power storage at BS j, an assumption may be made that the energy generation rate does not change in the duration of L cell size updates. The on-grid energy consumed by BS j during the ith interval may then be expressed as:

$$G_{i,j} = \begin{cases} 0, & E_{i,j} \geq C_{i,j}; \\ C_{i,j}, & \text{otherwise.} \end{cases} \quad [4]$$

Based on equations [1] through [4], the cell size optimization (CSO) may be formulated as:

$$\min_{\left(\vec{P}_1^0, \vec{P}_2^0, \ldots, \vec{P}_i^0, \ldots, \vec{P}_L^0\right)} \sum_{i=1}^{L} \sum_{j=1}^{N} G_{i,j} \quad [5]$$

subject to:

$$\lambda_{k,i} \geq \gamma, \, k \in (1,2,\ldots,M). \quad [6]$$

Here, $\lambda_{k,i}$ is the receiving signal noise ratio (SNR) of user k at the ith duration, and $\gamma$ is the minimal SNR requirement.

During L cell size updates, the mobile network may be in three different network states in terms of energy sources. The first network state may correspond to the case that all the BSs have sufficient renewable energy storage to serve all the users. In the second network state some of the BSs may rely on renewable energy while others may draw energy from the grid to serve the mobile users 206, 208, 210. The third network status may correspond to the case that all the BSs serve users by using on-grid energy because the renewable energy in BSs are depleted. In the first two network states, renewable energy may be utilized to serve users. According to Eq. [Error! Reference source not found.], the energy storage at the ith duration depends on the energy storage, consumptions and generations of the previous durations. Thus, the optimal cell size at the ith duration may depend on the cell size in previous durations. Therefore, the CSO approach may be decomposed into two sub-approaches. The first sub-approach is the multistage energy allocation (MEA) for individual BSs. The solution of MEA may determine the amount of renewable energy to be allocated at individual BSs during each cell size update, given energy allocation decision of other BSs. The MEA approach may be expressed as:

$$\max_{(\beta_{1,j},\beta_{2,j},\ldots,\beta_{i,j},\ldots,\beta_{L,j})} \sum_{i=1}^{L} U_i(\beta_{i,j}, \beta_{i,\setminus j}) \qquad [7]$$

subject to:

$$\sum_{i=1}^{l} \beta_{i,j} \leq E_{0,j} + l\alpha\tau, \quad l \in (1, 2, \ldots, L). \qquad [8]$$

In equations [7] and [8], $U_i$ is the network utility in terms of energy savings at the ith cell size update. $\beta_{i,j}$ is the amount of renewable energy allocated to BS j at the ith cell size update. $\beta_{i,\setminus j}$ represents the renewable energy allocations of BSs except BS j. Therefore, the optimal energy allocation for individual BSs may depend on the energy allocation strategies of all the other BSs and the energy demand at each cell size update.

The second sub-approach is to minimize energy consumptions (MEC) at individual cell size update durations. The MEC sub-approach may be formulated as:

$$\min_{p_i^0} \sum_{j=1}^{N} G_{i,j} \qquad [9]$$

subject to:

$$\lambda_{k,i} \geq \gamma, \beta'_{i,j} \leq \beta_{i,j}, k \in (1,2,\ldots,M). \qquad [10]$$

Here, $\beta'_{i,j}$ is the renewable energy consumption, and it is a function of the pilot signal power of BS j at the ith cell size update, $p_{i,j}^0$. According to Eq. [4], the from-grid energy consumption $G_{i,j}$ is zero if the renewable energy storage $E_{i,j}$ is larger than the energy cost $C_{i,j}$; otherwise, BSs consume from-grid energy. Therefore, to solve the MEC, the first step may be to minimize the number of BSs which consume from-grid energy.

As discussed above, the CSO may be broken down to two sub-approaches: the MEA and MEC. The solution of MEA may determine the amount of renewable energy allocated at individual BSs during each cell size update. Based on this, optimal cell size adaptation may be achieved by solving MEC. However, the solution of MEA may also depend on the solution of MEC because the solution of MEA determines the amount of energy to be consumed at individual BSs during each cell size update. According to some examples, as much renewable energy as possible may be allocated to individual BSs in meeting their energy demands, derived from solving the MEC. Thus, an algorithm for a desirable MEA policy may begin with an initial energy allocation to solve MEC, and then iterative adaptation of the energy allocation based on the solutions of MEC.

Since the solution of MEA depends on that of MEC, simple energy allocation policies may be proposed to adapt the energy allocation at each stage to minimize the overall from-grid energy consumption. Each BS may be allocated a pre-defined amount of energy as an initial energy storage at the beginning of each cell size update. Based on the initial allocation, the MEC may minimize the from-grid energy consumption of each BS. With $a_{i,j}$ and $d_{i,j}$ being the initial renewable energy allocation and the energy demand at BS j during the ith cell size update, respectively, the BSs may try to increase their renewal energy allocations to meet their energy demands and to avoid consuming from-grid energy, since from-grid energy is consumed when the BSs are allocated with renewable energy below their energy demands. For example, if $a_{i,j}$ is less than $d_{i,j}$, BS j may try to increase its renewable energy allocation by $d_{i,j}-a_{i,j}$. The amount of renewable energy that can be increased at BS j during the ith cell size update may depend on the total renewable energy storage $E^t_{i,j}$ and the energy adaptation ratio, $\delta$, which determines the percentage of the total renewable energy storage can be allocated to individual BSs at each cell size update duration.

An example MEA policy implementation algorithm is shown below:

---
Algorithm 1 The MEA Policy for j = 1 to N do
        if $(a_{i,j} < d_{i,j})$ & $(d_{i,j} - a_{i,j} < \delta E_{i,j}^t)$ then
            Return $a_{i,j} = d_{i,j}$;
        end if
    end for

---

Figure 3:
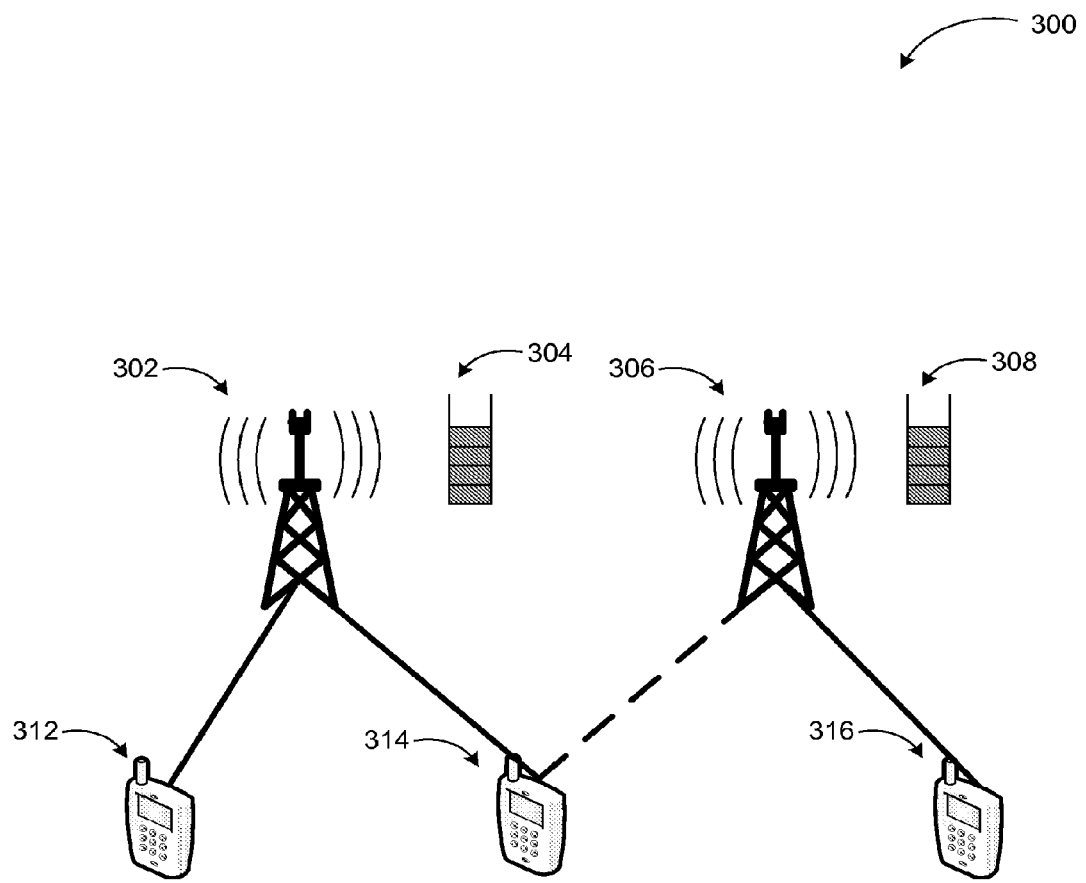
FIG. 3 illustrates conceptually adjustment of base station power for optimized hybrid energy usage and switching of an end device to another base station as a result.

FIG. 3 illustrates conceptually adjustment of base station power for optimized hybrid energy usage and switching of an end device to another base station as a result, arranged in accordance with at least some embodiments described herein.

Given the renewable energy allocation at individual BSs during each cell size update, the MEC may be treated in two steps. First, the number of BSs that consume on-grid energy may be minimized because $G_{i,j}$ is positive when BS j consumes on-grid energy at each cell update. Second, the number of BSs that can be switched into the sleep mode may be maximized. Let $\rho_{i,j}$ be the energy drain rate (EDR), defined as $d_{i,j}/a_{i,j}$. Minimizing the number of BSs that consume from-grid energy may be minimizing the number of BSs with EDR larger than 1. Therefore, the algorithm may first find the BSs with EDR larger than 1, and reduce the cell sizes of these BSs by reducing their pilot signal power in order to reduce their energy demands. While reducing the energy demand of these BSs, EDRs of the other BSs may increase beyond 1. For example, in diagram 300, both BSs 302 and 306 may have 10 units of power storage (304 and 308, respectively), and user 1 (312) may currently associate with BS 302. The energy demand on BS 302 may be 11, which makes the EDR larger than 1. In some examples, a third user (316) may be involved. The energy demand on BS 302 may be 11, which makes the EDR larger than 1. Therefore, BS 302 may reduce its pilot power to enable user 2 (314) switch to BS 306. As a result, the EDR of BS 306 may be larger than 1, and BS 306 may reduce its pilot power. Then, user 1 (312) may switch back to BS 302. The back-and-forth process may hardly reach the optimal solution.

To address the above-discussed shortcoming, energy dependent set (EDS) may be used. Let $\rho_{i,j}$ be the EDR of BS j at the ith cell size update with $$D'=\{\kappa | \rho_{i,k}>1, \kappa \in (1,2,\ldots,N)\}, \qquad [11]$$

Also, let $\rho'_{i,j}$ be the EDR of BSs j after the pilot power reduction of the BSs in D'. Then, for EDS:

$$D=\{\kappa | \rho'_{i,k}>1, \kappa \in (1,2,\ldots,N)\}, \qquad [12]$$

In order to reduce the EDRs of the BSs with EDRs larger than 1, the pilot signal power of the BSs in the EDS may be reduced together. The pseudo code of the example cell size adaptation (CSA) algorithm is listed as Algorithm Error! Reference source not found. below.

Algorithm 2 The CSA Algorithm

Initialize $\vec{P}_i^0$ and $a_{i,j}$, $j \in (1, 2, \ldots, N)$;
Calculate and sort $\rho_{i,j}$ from largest to smallest;
Find the set D that $\rho_{i,j} > 1$, $j \in D$:
  for m = 1 to |D| do
    while 1 do
      If ($\rho_{i,D(m)}^0$ is minimal) $|(\rho_{i,D(m)}^i == \rho_{i,D(m)})$ then
      Break:
      else
        Find the EDS of BS D(m);
        Reduce pilot power of BSs in EDS:
        Calculate EDR $\rho_{i,D(m)}^i$;
      end if
    end while
  end for
Return $\vec{P}_i^0$, and $\Sigma_{j=1}^N G_{i,j}$;

A cell size adaptation algorithm according to some embodiments may not enable the switch to sleep to save energy. Therefore, a further check may be performed whether some BSs can be put into the sleep mode based on the derived cell size coverage. The BSs whose per user energy consumption is larger than a predetermined threshold may be selected as the candidate BSs to be switched into the sleep mode. Then, whether the energy consumption can be reduced by switching the BSs to the sleep mode may be examined. If the energy consumption can be reduced, these BSs may be switched to the sleep mode; otherwise, they may be kept in the active status.

The MEA policy and the MEC algorithm may be combined according to some examples, in order to complete the CSO approach. With $\vec{A} = (a_{i,1}, a_{i,2}, \ldots, a_{i,n})$ being the renewable energy allocation vector at the ith cell size update, and $\vec{A} = (a_{0,1}, a_{0,2}, \ldots, a_{0,n})$ being the initial energy allocation at each cell size update, an example pseudo code of the CSO algorithm is listed as Algorithm Error! Reference source not found. below.

Algorithm 3 The CSO algorithm

Initialize $\vec{P}_i^0$ with maximal pilot power;
Initialize $A_0$:
for i = 1 to L do
  Set $\vec{A}_0^i = 0$, and $\vec{A}_i = \vec{A}_0$;
  while $\vec{A}_0 \neq \vec{A}_0^i$ do
    $\vec{A}_0^i = \vec{A}_0$;
    $[\vec{P}_i^0, \Sigma_{j=1}^N G_{i,j}]$ =CSA $(\vec{P}_i^0, \vec{A}_i)$;
    Adapt $\vec{A}_i$ based on EMA;
  end while
  Select the set, S, of BSs to sleep;
  if $|S| \geq 1$ then
    Adapt $\vec{P}_i^0$ to enable the sleep mode;
    Recompute $\vec{P}_i^{0S}$ and $\Sigma_{j=1}^N G_{i,j}^S$;
  end if
  If $\Sigma_{j=1}^N G_{i,j}^S < \Sigma_{j=1}^N G_{i,j}$ then
    Return $\Sigma_{j=1}^N G_{i,j}^S$ and $\vec{P}_i^{0S}$;
  else
    Return $\Sigma_{j=1}^N G_{i,j}$ and $\vec{P}_i^0$;
  end if
end for Embodiments may be implemented via combinations of hardware and software components. The software components may include existing or new communication or signaling systems, proposed to communicate information to base stations regarding their pilot power levels. Moreover, embodiments are not limited to cellular phone systems, but may be implemented in any wireless network system that employs a cellular infrastructure with control communications between base stations.

While embodiments have been discussed above using specific examples, components, scenarios, and configurations in FIG. 1 through FIG. 3, they are intended to provide a general guideline to be used for implementing reduction of the from-power-grid energy consumption of a wireless network such as a cellular network over a period of time through cell size adaptations. These examples do not constitute a limitation on the embodiments, which may be implements using other components, optimization schemes, and configurations using the principles described herein. For example, other algorithms may be implemented than those provided as example for solving MEA, MEC, and CSO approaches, and the like.

Figure 4:
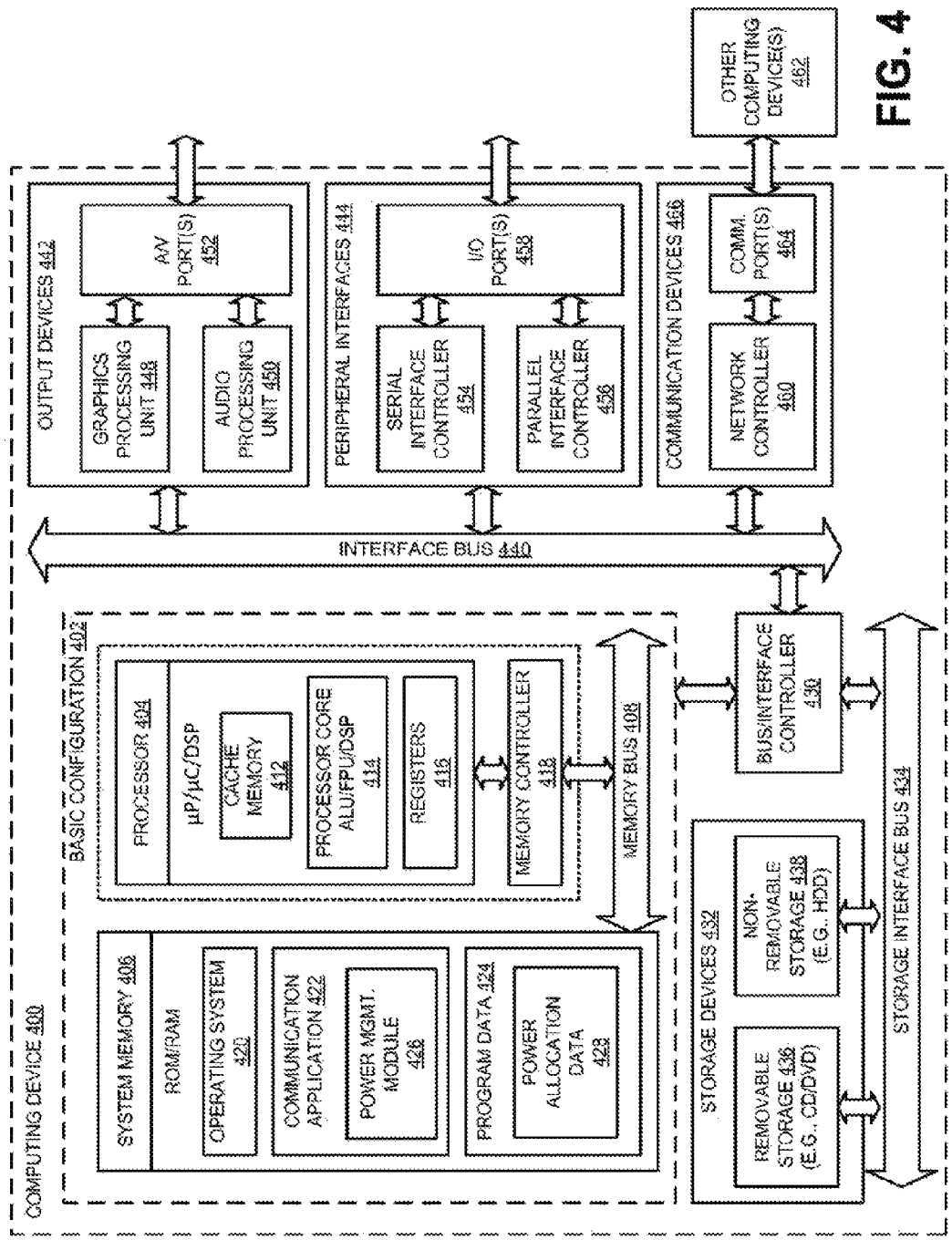
FIG. 4 illustrates a general purpose computing device, which may be used to implement optimization of cellular network cell sizes for overall energy savings and/or maximization of renewable energy use.

FIG. 4 illustrates a general purpose computing device, which may be used to implement optimization of cellular network cell sizes for overall energy savings and/or maximization of renewable energy use, arranged in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a cache memory 412, a processor core 414, and registers 416. Example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more communication applications 422, and program data 424. Communication application 422 may include a power management module 426 that is arranged to reduce on-grid energy consumption of a cellular network over a period of time using cell size adaptations by optimizing cell sizes of base stations. Cell size optimization may be accomplished employing a multi-stage energy allocation technique and an energy consumption minimization technique. Program data 424 may include one or more of power allocation data 428 (e.g. cell sizes, etc.) and similar data as discussed above in conjunction with at least FIG. 1 through 3. This data may be useful for optimizing on-grid power consumption as is described herein. In some embodiments, communication application 422 may be arranged to operate with program data 424 on operating system 420 such that renewable energy consumption of cellular networks is increased as described herein. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 466) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 466 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a physical server, virtual server, a computing cloud, or a hybrid device that include any of the above functions. Computing device 400 may also be implemented as a personal computer including both laptop computer and non-laptop computer configurations. Moreover computing device 400 may be implemented as a networked system or as part of a general purpose or specialized server.

Networks for a networked system including computing device 400 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such (e.g., the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Figure 5:
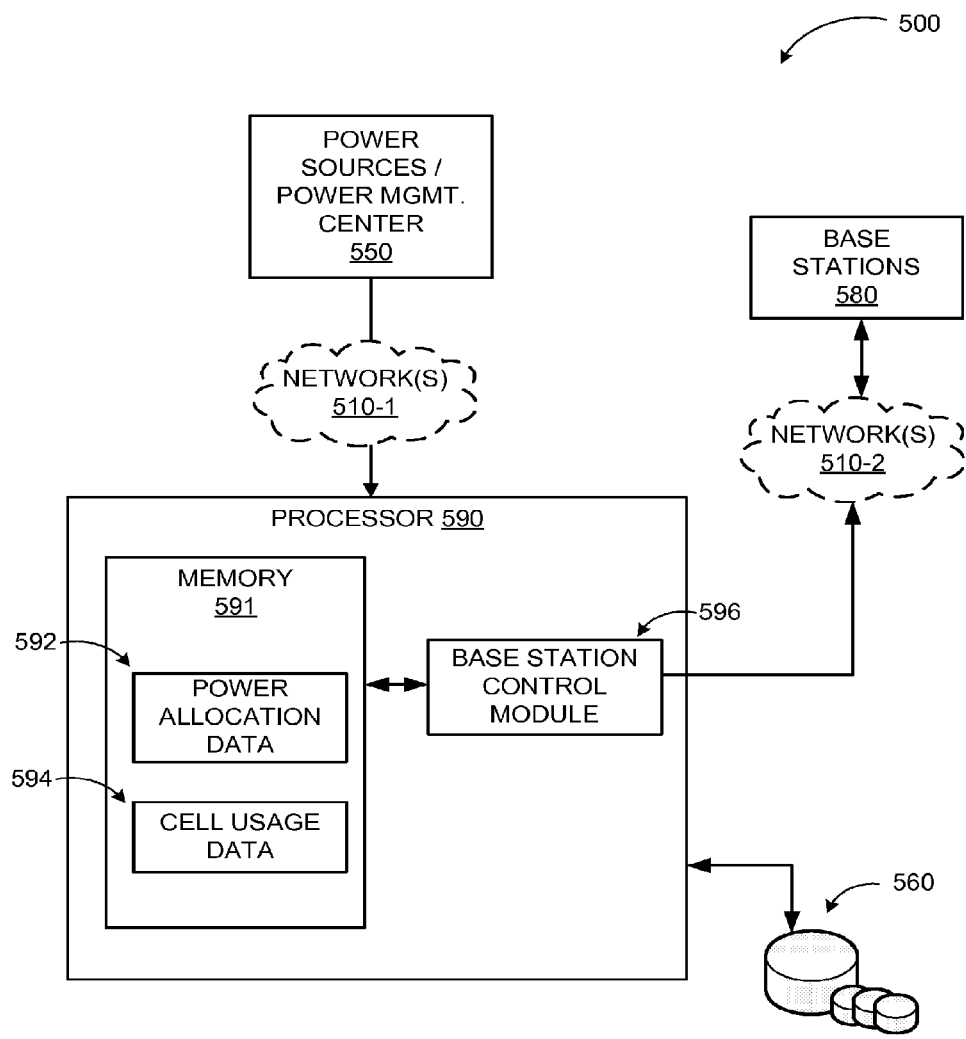
FIG. 5 illustrates a special purpose processor, which may be used to implement optimization of cellular network cell sizes for overall energy savings and/or maximization of renewable energy use.

FIG. 5 illustrates a special purpose processor, which may be used to implement optimization of cellular network cell sizes for overall energy savings and/or maximization of renewable energy use, arranged in accordance with at least some embodiments described herein.

Processor 590 in diagram 500 may be part of a computing device (e.g., a controller for the cellular network) that is communicatively coupled to one or more base stations 580, which may facilitate communication with end user devices through network(s) 510-2. Processor 590 may alternatively communicate with the base stations 580 over other networks such as wired networks, microwave networks, etc. Processor 590 may also communicate with power sources or power management center 550 through a network 510-1 to gather power composition related information. Processor 590 may store power optimization related data at one or more data stores 560.

Processor 590 may include a number of processing modules such as base station control module 596. Power allocation data 592 and cell usage data 594 may be used by processor 590 in conjunction with base station control module 596 for optimizing cell sizes by decomposing the cell size optimization into two approaches: a multi-stage energy allocation approach and an energy consumption minimization approach. By implementing an energy allocation policy based on available energy type (e.g., from-power-grid or renewable) and an approximation technique for the energy consumption minimization, cell size optimization for each base station may be achieved resulting in network-wide enhancement of renewable energy usage vs. from-power-grid energy usage. Power allocation data 592 and cell usage data 594 may be stored during processing in memory 591, which may be a cache memory of the processor 590 or in an external memory (e.g., memory external to processor 590).

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 6:
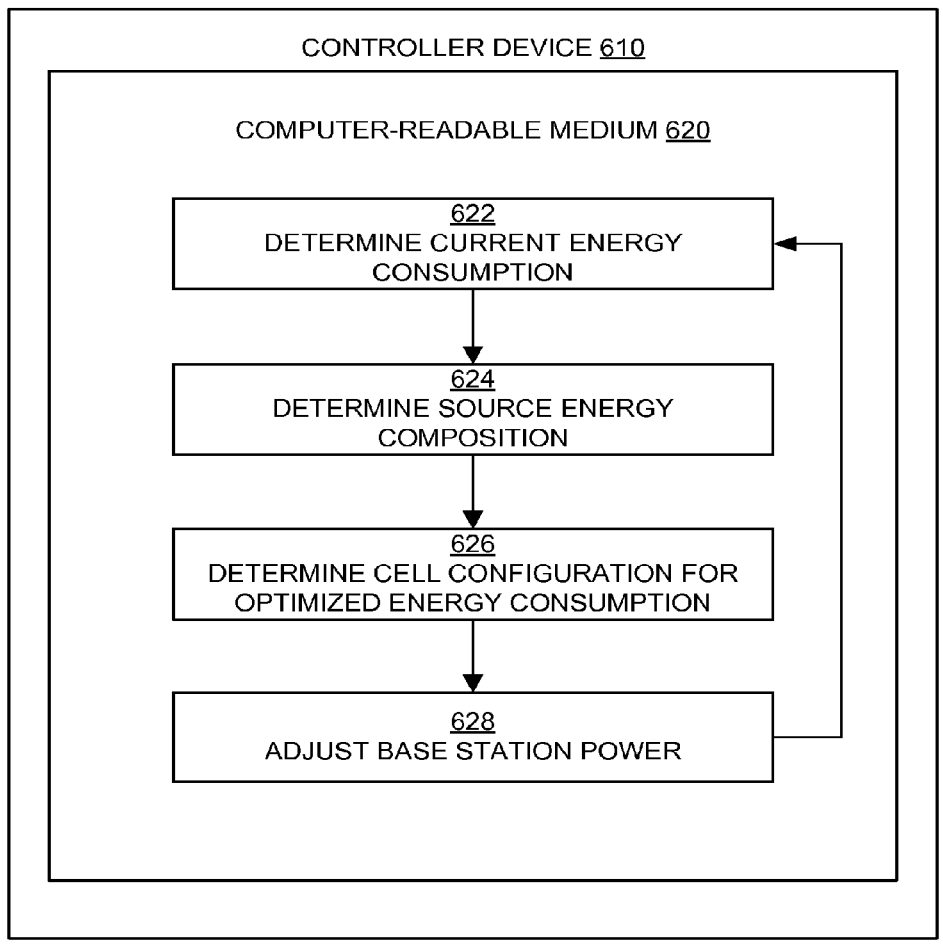
FIG. 6 is a flow diagram illustrating an example method for employing optimization of cellular network cell sizes for overall energy savings and/or maximization of renewable energy use that may be performed by a computing device such as the device in FIG. 4 or the special purpose processor in FIG. 5.

FIG. 6 is a flow diagram illustrating an example method for employing optimization of cellular network cell sizes for overall energy savings and/or maximization of renewable energy use that may be performed by a computing device such as the device in FIG. 4 or the special purpose processor in FIG. 5, arranged in accordance with at least some embodiments described herein.

Thus, controller device 610 may be embodied as computing device 400, special purpose processor 590, or similar devices executing instructions stored in computer-readable medium 620 for performing the method. A process of optimizing cellular network cell sizes for overall energy savings and/or maximization of renewable energy use may include one or more operations, functions or actions as is illustrated by one or more of blocks 622, 624, 626, and/or 628.

Some example processes may begin with operation 622, "DETERMINE CURRENT ENERGY CONSUMPTION". At operation 622, a network controller such as controller 212 of FIG. 2 may determine power consumption of one or more base stations such as base station 204.

Operation 622 may be followed by operation 624, "DETERMINE SOURCE ENERGY COMPOSITION." At operation 624, the controller 212 may further determine 214, 216 the energy composition of the power source for the network, specifically for the one or more base stations being examined. The energy composition may mean the power source is from-power-grid (typically fossil-based) (218, 222) or renewable (220, 224) as shown in diagram 200 of FIG. 2.

Operation 624 may be followed by operation 626, "DETERMINE CELL CONFIGURATION FOR OPTIMIZED ENERGY CONSUMPTION". At operation 626, the controller 212 may determine a suitable cell size for optimizing renewable energy based power consumption of one or more base stations such as base station 204. This may mean the cell size being larger or smaller than its current value.

Operation 626 may be followed by operation 628, "ADJUST BASE STATION POWER". At operation 628, the controller 212 may instruct the base station 204 to adjust its transmit power such that the current cell size can be adjusted to an optimum value for increased renewable energy based power consumption.

The operations included in the process of FIG. 6 described above are for illustration purposes. Reducing the from-power-grid energy consumption of a wireless network such as a cellular network over a period of time through cell size adaptations may be implemented by similar processes with fewer or additional operations. In some examples, the operations may be performed in a different order. In some other examples, various operations may be eliminated. In still other examples, various operations may be divided into additional operations, or combined together into fewer operations. Although illustrated as sequentially ordered operations, in some implementations the various operations may be performed in a different order, or in some cases various operations may be performed at substantially the same time.

Figure 7:
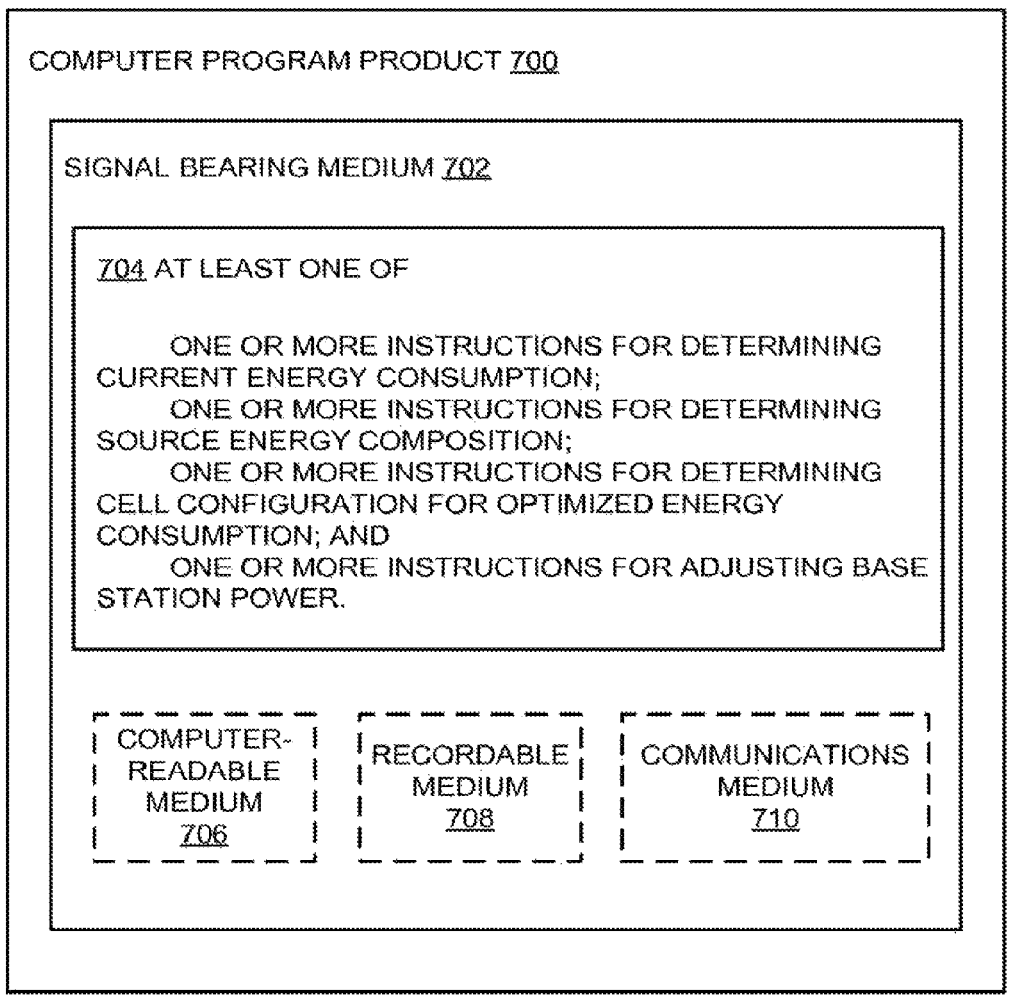
FIG. 7 illustrates a block diagram of an example computer program product for implementing optimization of cellular network cell sizes for overall energy savings and/or maximization of renewable energy use, all arranged in accordance with at least some embodiments described herein.

FIG. 7 illustrates a block diagram of an example computer program product for implementing optimization of cellular network cell sizes for overall energy savings and/or maximization of renewable energy use, arranged in accordance with at least some embodiments described herein.

In some examples, as shown in FIG. 7, computer program product 700 may include a signal bearing medium 702 that may also include machine readable instructions 704 that, when executed by, for example, a processor, may provide the functionality described above with respect to FIG. 1 through FIG. 3. Thus, for example, referring to processor 590, one or more of the tasks shown in FIG. 7 may be undertaken in response to instructions 704 conveyed to the processor 590 by signal bearing medium 702 to perform actions associated with optimizing cell traffic load and interference through high interference indicators as described herein. Some of those instructions may include determining current energy consumption, determining source energy composition, determining cell configuration for optimized energy consumption, and adjusting base station power using one or more algorithms as described previously.

In some implementations, signal bearing medium 702 depicted in FIG. 7 may encompass a computer-readable medium 706, such as, but not limited to, a hard disk drive, a Compact Disc (CD), a Digital Versatile Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, computer program product 700 may be conveyed to the processor 404 by an RF signal bearing medium 702, where the signal bearing medium 702 is conveyed by a wireless communications medium 710 (e.g., a wireless communications medium conforming with the IEEE 802.11 standard).

According to some examples, a method for optimizing hybrid energy use in cellular communication networks through cell size adjustment is described. An example method may include determining an energy consumption by a plurality of base stations in a cellular communication network and determining an energy allocation for each of the base stations, where the energy allocation for each of the base stations depends on energy allocations for remaining base stations. The example method may also include instructing the base stations to adjust their transmit power according to the determined energy allocation for each base station; and causing cell sizes for each of the base stations to be adjusted based on end devices in respective cells selecting to remain in their respective cell or to switch to another base station based on the adjusted transmit power of their respective base stations.

According to other examples, the method may further include determining the energy allocation for each of the base stations and instructing the base stations to adjust their transmit power during periodic cell size updates; determining the energy allocation based on an availability of a renewable energy portion of an overall energy supply; or determining the energy allocation by starting with an initial energy allocation that minimizes consumption of a non-renewable energy portion of the overall energy supply for at least one base station and iteratively adapting energy allocations based on minimization of the consumption of the non-renewable energy portion for remaining base stations.

According to further examples, the method may also include determining a network state associated with an available energy composition, where the network state is a first network state corresponding to a majority of the base stations having sufficient renewable energy storage to serve end devices in their respective cells, a second network state corresponding to a portion of the base stations having to rely on non-renewable energy to serve the end devices in their respective cells, or a third network state corresponding to a majority of the base stations having to rely on non-renewable energy to serve the end devices in their respective cells.

According to yet other examples, the method may also include determining the energy allocation for each of the base stations based on the determined network state prior to a cell size update. The energy allocation may be further determined based on one or more of an energy storage, an energy consumption, and/or an energy generation for the communication network in one or more previous cell size updates. The renewable energy portion may include one or more of solar energy, wind energy, hydroelectric energy, and/or biomass energy. The method may further include determining the energy allocation for each of the base stations based on available renewable energy and a consumption level for each of the base stations in a previous cell size update, or determining the energy allocation for each of the base stations by reducing a number of base stations consuming non-renewable energy and increasing a number of base stations that can be inactivated. The method may include inactivating the base stations that can be inactivated.

According to other examples, a controller for a cellular communication network that optimizes hybrid energy use through cell size adjustment is described. An example controller may include a communication module configured to communicate with a plurality of base stations, a power distribution module configured to receive non-renewable grid energy and provide to the plurality of base stations, and a power management module. The power management module may determine an energy consumption by a plurality of base stations and determine an energy allocation for each of the base stations, where the energy allocation for each of the base stations depends on energy allocations for remaining base stations. The power management module may also instruct the base stations to adjust their transmit power according to the determined energy allocation for each base station and cause cell sizes for each of the base stations to be adjusted based on end devices in respective cells selecting to remain in their respective cell or to switch to another base station based on the adjusted transmit power of their respective base stations.

According to some examples, the power management module may further determine the energy allocation for each of the base stations and instruct the base stations to adjust their transmit power during periodic cell size updates, determine the energy allocation based on an availability of a renewable energy portion of an overall energy supply, or determine the energy allocation by starting with an initial energy allocation that minimizes consumption of a non-renewable energy portion of the overall energy supply for at least one base station and iteratively adapting energy allocations based on minimization of the consumption of the non-renewable energy portion for remaining base stations. The power management module may also determine a network state associated with an available energy composition, where the network state is a first network state corresponding to a majority of the base stations having sufficient renewable energy storage to serve end devices in their respective cells, a second network state corresponding to a portion of the base stations having to rely on non-renewable energy to serve the end devices in their respective cells, or a third network state corresponding to a majority of the base stations having to rely on non-renewable energy to serve the end devices in their respective cells.

According to further examples, the power management module may also determine the energy allocation for each of the base stations based on the determined network state prior to a cell size update. The energy allocation may be further determined based on one or more of an energy storage, an energy consumption, and/or an energy generation for the communication network in one or more previous cell size updates. The renewable energy portion may include one or more of solar energy, wind energy, hydroelectric energy, and/or biomass energy. The renewable energy portion may be provided to the base stations through local generation near the base station or central distribution through the power distribution module.

According to yet other examples, the power management module may further determine the energy allocation for each of the base stations based on available renewable energy and a consumption level for each of the base stations in a previous cell size update, determine the energy allocation for each of the base stations by reducing a number of base stations consuming non-renewable energy and increasing a number of base stations that can be inactivated, or inactivate the base stations that can be inactivated.

According to further examples, a cellular-structured wireless communication network capable of optimizing hybrid energy use in through cell size adjustment is described. An example network may include a plurality of base stations serving end devices in their respective cells and a controller managing communication and power management operations of the base stations. The controller may determine an energy consumption by a plurality of base stations and determine an energy allocation for each of the base stations, where the energy allocation for each of the base stations depends on energy allocations for remaining base stations. The controller may also instruct the base stations to adjust their transmit power according to the determined energy allocation for each base station and cause cell sizes for each of the base stations to be adjusted based on the end devices in respective cells selecting to remain in their respective cell or to switch to another base station based on the adjusted transmit power of their respective base stations.

According to some examples, the controller may also determine the energy allocation for each of the base stations and instruct the base stations to adjust their transmit power during periodic cell size updates, determine the energy allocation based on an availability of a renewable energy portion of an overall energy supply, or determine the energy allocation by starting with an initial energy allocation that minimizes consumption of a non-renewable energy portion of the overall energy supply for at least one base station and iteratively adapting energy allocations based on minimization of the consumption of the non-renewable energy portion for remaining base stations.

According to other examples, the controller may also determine a network state associated with an available energy composition, where the network state a first network state corresponding to a majority of the base stations having sufficient renewable energy storage to serve end devices in their respective cells, a second network state corresponding to a portion of the base stations having to rely on non-renewable energy to serve the end devices in their respective cells, or a third network state corresponding to a majority of the base stations having to rely on non-renewable energy to serve the end devices in their respective cells.

According to yet other examples, the controller may determine the energy allocation for each of the base stations based on the determined network state prior to a cell size update. The energy allocation may be further determined based on one or more of an energy storage, an energy consumption, and/or an energy generation for the communication network in one or more previous cell size updates. The renewable energy portion may include one or more of solar energy, wind energy, hydroelectric energy, and/or biomass energy. The renewable energy portion may be provided to the base stations through local generation near the base station or central distribution through the power distribution module.

According to further examples, the controller may determine the energy allocation for each of the base stations based on available renewable energy and a consumption level for each of the base stations in a previous cell size update, determine the energy allocation for each of the base stations by reducing a number of base stations consuming non-renewable energy and increasing a number of base stations that can be inactivated, or inactivate the base stations that can be inactivated.

According to yet other examples, a computer-readable storage medium with instructions stored thereon for optimizing hybrid energy use in cellular communication networks through cell size adjustment is described. The instructions may cause a method to be performed when executed. The method may include determining an energy consumption by a plurality of base stations in a cellular communication network and determining an energy allocation for each of the base stations, where the energy allocation for each of the base stations depends on energy allocations for remaining base stations. The method may further include instructing the base stations to adjust their transmit power according to the determined energy allocation for each base station and causing cell sizes for each of the base stations to be adjusted based on end devices in respective cells selecting to remain in their respective cell or to switch to another base station based on the adjusted transmit power of their respective base stations.

According to other examples, the method may further include determining the energy allocation for each of the base stations and instructing the base stations to adjust their transmit power during periodic cell size updates; determining the energy allocation based on an availability of a renewable energy portion of an overall energy supply; or determining the energy allocation by starting with an initial energy allocation that minimizes consumption of a non-renewable energy portion of the overall energy supply for at least one base station and iteratively adapting energy allocations based on minimization of the consumption of the non-renewable energy portion for remaining base stations.

According to further examples, the method may also include determining a network state associated with an available energy composition, where the network state is a first network state corresponding to a majority of the base stations having sufficient renewable energy storage to serve end devices in their respective cells, a second network state corresponding to a portion of the base stations having to rely on non-renewable energy to serve the end devices in their respective cells, or a third network state corresponding to a majority of the base stations having to rely on non-renewable energy to serve the end devices in their respective cells.

According to yet other examples, the method may also include determining the energy allocation for each of the base stations based on the determined network state prior to a cell size update. The energy allocation may be further determined based on one or more of an energy storage, an energy consumption, and/or an energy generation for the communication network in one or more previous cell size updates. The renewable energy portion may include one or more of solar energy, wind energy, hydroelectric energy, and/or biomass energy. The method may further include determining the energy allocation for each of the base stations based on available renewable energy and a consumption level for each of the base stations in a previous cell size update, or determining the energy allocation for each of the base stations by reducing a number of base stations consuming non-renewable energy and increasing a number of base stations that can be inactivated. The method may include inactivating the base stations that can be inactivated.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to manage hybrid energy use in a cellular communication network through cell size adjustment, the method comprising:
   determining an energy consumption by base stations in the cellular communication network;

instructing the base stations to perform a multistage energy allocation (MEA) for each of the base stations to determine an amount of the energy consumption to be allocated at each of the base stations during updates of cell sizes for each of the base stations, wherein an energy allocation for each of the base stations depends on energy allocations for remaining base stations;

instructing the base stations to adjust a transmit power according to the energy allocation for each of the base stations; and controlling the hybrid energy use in the cellular communication network to reduce the energy consumption of each of the base stations, wherein the controlling includes:

instructing the base stations to reduce energy consumption during the updates of the cell sizes for each of the base stations; and causing an adjustment of the cell sizes for each of the base stations based on one of: a selection of end devices to remain in respective cells and a switch to another base station based on the adjusted transmit power of respective base stations.

2. The method according to claim 1, further comprising:
determining the energy allocation based on an availability of a renewable energy portion of an overall energy supply.

3. The method according to claim 2, wherein determining the energy allocation includes:
determining the energy allocation by:
starting with an initial energy allocation that reduces consumption of a non-renewable energy portion of the overall energy supply for at least one of the base stations, and
iteratively adapting energy allocations based on a reduction of the consumption of the non-renewable energy portion for remaining base stations.

4. The method according to claim 1, further comprising:
determining a network state associated with an available energy composition, wherein the network state is one of:
a first network state that corresponds to a majority of the base stations that include an amount of stored renewable energy to serve the end devices in the respective cells,
a second network state that corresponds to a portion of the base stations that use a non-renewable energy to serve the end devices in the respective cells, and
a third network state that corresponds to a majority of the base stations that use the non-renewable energy serve the end devices in the respective cells.

5. The method according to claim 4, further comprising:
determining the energy allocation for each of the base stations based on the determined network state prior to the updates of the cell sizes.

6. The method according to claim 5, wherein the energy allocation is further determined based on one or more of an energy storage, an energy consumption, and an energy generation for the cellular communication network in one or more previous updates of the cell sizes.

7. The method according to claim 4, wherein a renewable energy portion includes one or more of solar energy, wind energy, hydroelectric energy, and biomass energy.

8. The method according to claim 1, further comprising:
determining the energy allocation for each of the base stations based on available renewable energy and a consumption level for each of the base stations in previous updates of the cell sizes.

9. The method according to claim 1, further comprising:
determining the energy allocation for each of the base stations by:
reducing a number of the base stations that consume non-renewable energy, and
increasing the number of the base stations that can be inactivated.

10. The method according to claim 9, further comprising:
inactivating the base stations that can be inactivated.

11. A computing device to manage hybrid energy use in a cellular communication network through cell size adjustment, the computing device comprising:
a memory configured to store a communication application, wherein the communication application is configured to communicate with base stations, and wherein the communication application includes a power distribution module configured to receive non-renewable grid energy and provide the non-renewable grid energy to the base stations; and
a processor coupled to the memory, wherein the processor is configured to execute the communication application so as to operate the power distribution module to:
determine an energy consumption by the base stations;
instruct the base stations to perform a multistage energy allocation (MEA) for each of the base stations to determine an amount of the energy consumption to be allocated at each of the base stations during updates of cell sizes for each of the base stations, wherein an energy allocation for each of the base stations depends on energy allocations for remaining base stations;
instruct the base stations to adjust a transmit power according to the energy allocation for each of the base stations; and
control the hybrid energy use in the cellular communication network to reduce the energy consumption of each of the base stations, wherein the control of the hybrid energy use includes processes to:
instruct the base stations to reduce energy consumption during the updates of the cell sizes for each of the base stations; and
cause an adjustment of the cell sizes for each of the base stations based on one of: a selection of end devices to remain in respective cells and a switch to another base station based on the adjusted transmit power of respective base stations.

12. The computing device according to claim 11, wherein the processor is further configured to execute the communication application so as to operate the power distribution module to:
determine the energy allocation based on an availability of a renewable energy portion of an overall energy supply.

13. The computing device according to claim 12, wherein the processor is configured to execute the communication application so as to operate the power distribution module to:
determine the energy allocation by a process configured to:
start with an initial energy allocation that reduces consumption of a non-renewable energy portion of the overall energy supply for at least one of the base stations, and
perform an iterative adaptation of energy allocations based on a reduction of the consumption of the non-renewable energy portion for remaining base stations.

14. The computing device according to claim 11, wherein the processor is further configured to execute the communication application so as to operate the power distribution module to:
 determine a network state associated with an available energy composition, wherein the network state is one of:
  a first network state that corresponds to a majority of the base stations that include an amount of stored renewable energy to serve the end devices in the respective cells,
  a second network state that corresponds to a portion of the base stations that use a non-renewable energy to serve the end devices in the respective cells, and
  a third network state that corresponds to a majority of the base stations that use the non-renewable energy to serve the end devices in the respective cells.

15. The computing device according to claim 14, wherein the processor is configured to execute the communication application so as to operate the power distribution module to:
 determine the energy allocation for each of the base stations based on the determined network state prior to the updates of the cell sizes.

16. The computing device according to claim 15, wherein the allocation is further determined based on one or more of an energy storage, an energy consumption, and an energy generation for the cellular communication network in one or more previous updates of the cell sizes.

17. The computing device according to claim 14, wherein a renewable energy portion includes one or more of solar energy, wind energy, hydroelectric energy, and biomass energy.

18. The computing device, according to claim 14, wherein a renewable energy portion is provided to the base stations through one of: local generation near each of the base stations and central distribution through the power distribution module.

19. The computing device according to claim 11, wherein the processor is further configured to execute the communication application so as to operate the power distribution module to:
 determine the energy allocation for each of the base stations based on available renewable energy and a consumption level for each of the base stations in previous updates of the cell sizes.

20. The computing device according to claim 11, wherein the processor is further configured to execute the communication application so as to operate the power distribution module to:
 determine the energy allocation for each of the base stations by:
  reduction of a number of the base stations that consume non-renewable energy, and
  increase of the number of the base stations that can be inactivated.

21. The computing device according to claim 20, wherein the processor is further configured to execute the communication so as to operate the power distribution module to:
 inactivate the base stations that can be inactivated.

22. A cellular-structured wireless communication network that is configured to manage hybrid energy use in through cell size adjustment, the cellular-structured wireless communication network comprising:
 base stations that serve end devices in respective cells; and
 a controller configured to manage communication and power management operations of the base stations, the controller configured to:
  determine an energy consumption by the base stations;
  instruct the base stations to perform a multistage energy allocation (MEA) for each of the base stations to determine an amount of the energy consumption to be allocated at each of the base stations during updates of cell sizes for each of the base stations, wherein an energy allocation for each of the base stations depends on energy allocations for remaining base stations;
  instruct the base stations to adjust a transmit power according to the energy allocation for each of the base stations; and
  control the hybrid energy use in the cellular-structured wireless communication network to reduce the energy consumption of each of the base stations, wherein the control of the hybrid energy use includes processes to:
   instruct the base stations to reduce energy consumption during the updates of the cell sizes for each of the base stations; and
   cause an adjustment of the cell sizes for each of the base stations based on one of: a selection of the end devices to remain in the respective cells and a switch to another base station based on the adjusted transmit power of respective base stations.

23. The cellular-structured wireless communication network according to claim 22, wherein the controller is further configured to:
 determine the energy allocation based on an availability of a renewable energy portion of an overall energy supply.

24. The cellular-structured wireless communication network according to claim 23, wherein the controller is configured to:
 determine the energy allocation by a process that is configured to:
  start with an initial energy allocation that reduces consumption of a non-renewable energy portion of the overall energy supply for at least one of the base stations, and
  perform an iterative adaptation of energy allocations based on a reduction of the consumption of the non-renewable energy portion for remaining base stations.

25. The cellular-structured wireless communication network according to claim 22, wherein the controller is further configured to:
 determine a network state associated with an available energy composition, wherein the network state is one of:
  a first network state that corresponds to a majority of the base stations that include an amount of stored renewable energy to serve the end devices in the respective cells,
  a second network state that corresponds to a portion of the base stations that use a non-renewable energy to serve the end devices in the respective cells, and
  a third network state that corresponds to a majority of the base stations that use the non-renewable energy to serve the end devices in the respective cells.

26. The cellular-structured wireless communication network according to claim 25, wherein the controller is configured to:
 determine the energy allocation for each of the base stations based on the determined network state prior to the updates of the cell sizes.

27. The cellular wireless communication network according to claim 26, wherein the energy allocation is further determined based on one or more of an energy storage, an energy consumption, and an energy generation for the cellular-structured wireless communication network in one or more previous updates of the cell sizes.

28. The cellular-structured wireless communication network according to claim 25, wherein a renewable energy portion includes one or more of solar energy, wind energy, hydroelectric energy, and biomass energy.

29. The cellular-structured wireless communication network according to claim 25, wherein a renewable energy portion is provided to the base stations through one of: local generation near each of the base stations and central distribution through a power distribution module of a communication application.

30. The cellular-structured wireless communication network according to claim 22, wherein the controller is further configured to:
    determine the energy allocation for each of the base stations based on available renewable energy and a consumption level for each of the base stations in previous updates of the cell sizes.

31. The cellular-structured wireless communication network according to claim 22, wherein the controller is further configured to:
    determine the energy allocation for each of the base stations by:
        reducing a number of the base stations consuming non-renewable energy, and
        increasing the number of the base stations that can be inactivated.

32. The cellular-structured wireless communication network according to claim 31, wherein the controller is further configured to:
    inactivate the base stations that can be inactivated.

33. A non-transitory computer-readable storage medium with instructions stored thereon to manage hybrid energy use in a cellular communication network through cell size adjustment, the instructions being executable by a processor to perform or cause to be performed:
    determining an energy consumption by base stations in the cellular communication network;
    instructing the base stations to perform a multistage energy allocation (MBA) for each of the base stations to determine an amount of the energy consumption to be allocated at each of the base stations during updates of cell sizes for each of the base stations, wherein an energy allocation for each of the base stations depends on energy allocations for remaining base stations;
    instructing the base stations to adjust a transmit power according to the energy allocation for each of the base stations; and
    controlling the hybrid energy use in the cellular communication network to reduce the energy consumption of each of the base stations, wherein the controlling includes:
        instructing the base stations to reduce energy consumption during the updates of the cell sizes for each of the base stations; and
        causing an adjustment of the cell sizes for each of the base stations based on one of: a selection of end devices to remain in respective cells and a switch to another base station based on the adjusted transmit power of respective base stations.

34. The non-transitory computer-readable storage medium according to claim 33, wherein the instructions are further executable by the processor to perform or cause to be performed:
    determining the energy allocation based on an availability of a renewable energy portion of an overall energy supply.

35. The non-transitory computer-readable storage medium according to claim 34, wherein the instructions are executable by the processor to perform or cause to be performed:
    determining the energy allocation by:
        starting with an initial energy allocation that reduces consumption of a non-renewable energy portion of the overall energy supply for at least one of the base stations, and
        iteratively adapting energy allocations based on a reduction of the consumption of the non-renewable energy portion for remaining base stations.

36. The non-transitory computer-readable storage medium according to claim 33, wherein the instructions are executable by the processor to perform or cause to be performed:
    determining a network state associated with an available energy composition, wherein the network state is one of:
        a first network state that corresponds to a majority of the base stations that include an amount of stored renewable energy to serve the end devices in the respective cells,
        a second network state that corresponds to a portion of the base stations that use a non-renewable energy to serve the end devices in the respective cells, and
        a third network state that corresponds o a majority of the base stations that use the non-renewable energy to serve the end devices in the respective cells.

37. The non-transitory computer-readable storage medium according to claim 36, wherein the instructions are executable by the processor to perform or cause to be performed:
    determining the energy allocation for each of the base stations based on the determined network state prior to the updates of the cell sizes.

38. The non-transitory computer-readable storage medium according to claim 37, wherein the energy allocation is further determined based on one or more of an energy storage, an energy consumption, and an energy generation for the cellular communication network in one or more previous updates of the cell sizes.

39. The non-transitory computer-readable storage medium according to claim 36, wherein a renewable energy portion includes one or more of solar energy, wind energy, hydroelectric energy, and biomass energy.

40. The non-transitory computer-readable storage medium according to claim 33, wherein the instructions are executable by the processor to perform or cause to be performed:
    determining the energy allocation for each of the base stations based on available renewable energy and a consumption level for each of the base stations in previous updates of the cell sizes.

41. The non-transitory computer-readable storage medium according to claim 33, wherein the instructions are executable by the processor to perform or cause to be performed:
    determining the energy allocation for each of the base stations by:
        reducing a number of the base stations consuming non-renewable energy, and
        increasing the number of the base stations that can be inactivated.

42. The non-transitory computer-readable storage medium according to claim 41, wherein the instructions are executable by the processor to perform or cause to be performed:
    inactivating the base stations that can be inactivated.

* * * * *

UNITED STATES PATENT AND TRADEMARK OFFICE
CERTIFICATE OF CORRECTION

PATENT NO. : 9,277,497 B2
APPLICATION NO. : 13/881147
DATED : March 1, 2016
INVENTOR(S) : Ansari et al.

Page 1 of 1

It is certified that error appears in the above-identified patent and that said Letters Patent is hereby corrected as shown below:

Specification

In Column 1, Lines 5-18, delete "STATEMENT REGARDING FEDERALLY SPONSORED RESEARCH OR DEVELOPMENT
This invention was made with government support under grant CNS1147602 awarded by the National Science Foundation. The government has certain rights in the invention.
CROSS-REFERENCE TO RELATED APPLICATION
This Application is the U.S. National Stage filing under 35 U.S.C §371 of PCT Application No. PCT/US2012/062135 filed on Oct. 26, 2012. The PCT Application is herein incorporated by reference in its entirety." and
insert -- CROSS-REFERENCE TO RELATED APPLICATION
This Application is the U.S. National Stage filing under 35 U.S.C. § 371 of PCT Application No. PCT/US2012/062135 filed on Oct. 26, 2012. The PCT Application is herein incorporated by reference in its entirety.
STATEMENT REGARDING FEDERALLY SPONSORED RESEARCH OR DEVELOPMENT
This invention was made with government support under grant CNS1147602 awarded by the National Science Foundation. The government has certain rights in the invention. --, therefor.

Claims

In Column 24, Line 62, in Claim 27, delete "cellular" and insert -- cellular-structured --, therefor.

In Column 25, Line 39, in Claim 33, delete "(MBA)" and insert -- (MEA) --, therefor.

Signed and Sealed this
Twenty-sixth Day of July, 2016

Michelle K. Lee
*Director of the United States Patent and Trademark Office*